United States Patent
Wang

(10) Patent No.: US 9,022,611 B2
(45) Date of Patent: May 5, 2015

(54) DISPLAY DEVICE AND METHOD FOR FABRICATING THE SAME

(71) Applicant: Chan hee Wang, Yongin (KR)

(72) Inventor: Chan hee Wang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/760,421

(22) Filed: Feb. 6, 2013

(65) Prior Publication Data

US 2013/0301272 A1    Nov. 14, 2013

(30) Foreign Application Priority Data

May 9, 2012    (KR) ................. 10-2012-0049089

(51) Int. Cl.
*F21V 9/00* (2006.01)
*G06F 1/16* (2006.01)

(52) U.S. Cl.
CPC ................. *F21V 9/00* (2013.01); *G06F 1/1656* (2013.01)

(58) Field of Classification Search
CPC ................................ F21V 9/00; G06F 1/1656
USPC ............ 345/173–176, 212; 362/293; 455/566
See application file for complete search history.

(56) References Cited

U.S. PATENT DOCUMENTS

| | | | |
|---|---|---|---|
| 8,154,523 B2 * | 4/2012 | Miller et al. .................. | 345/173 |
| 2003/0128191 A1 | 7/2003 | Strasser et al. | |
| 2004/0036680 A1 * | 2/2004 | Davis et al. .................... | 345/169 |
| 2008/0092043 A1 * | 4/2008 | Trethewey .................... | 715/705 |
| 2008/0119237 A1 * | 5/2008 | Kim ............................... | 455/566 |
| 2009/0017874 A1 | 1/2009 | Hong et al. | |
| 2009/0153438 A1 * | 6/2009 | Miller et al. .................... | 345/55 |
| 2010/0144394 A1 | 6/2010 | Han et al. | |
| 2010/0273530 A1 | 10/2010 | Jarvis et al. | |
| 2010/0309152 A1 | 12/2010 | Kusuda et al. | |
| 2011/0012841 A1 * | 1/2011 | Lin ................................ | 345/173 |
| 2011/0034214 A1 | 2/2011 | Hong et al. | |
| 2011/0096066 A1 | 4/2011 | Thompson et al. | |
| 2012/0075209 A1 * | 3/2012 | Lee et al. ....................... | 345/173 |
| 2013/0301272 A1 | 11/2013 | Wang | |

FOREIGN PATENT DOCUMENTS

| | | |
|---|---|---|
| CN | 201107517 (Y) | 8/2008 |
| CN | 101345942 A | 1/2009 |
| CN | 201369037 Y | 12/2009 |
| CN | 101842767 A | 9/2010 |
| CN | 101901104 A | 12/2010 |
| CN | 102237016 A | 11/2011 |
| CN | 102982735 A | 3/2013 |
| CN | 203397629 U | 1/2014 |
| DE | 10 2009 039 797 A1 | 6/2010 |

(Continued)

*Primary Examiner* — Thomas A Hollweg
(74) *Attorney, Agent, or Firm* — Lee & Morse, P.C.

(57) ABSTRACT

A display device includes a display member that displays an image, and a window member arranged on an upper surface of the display member. The window member includes a base member and a color layer, and the color layer is arranged on a lower surface of the base member and partially overlaps the display member. A part of the window member overlaps the display member, and the part of the window member receives a portion of the image from the display member as a received image and transmits the portion of the image therethrough as a transmitted image.

16 Claims, 12 Drawing Sheets

(56) References Cited

FOREIGN PATENT DOCUMENTS

| | | |
|---|---|---|
| EP | 2 209 062 A1 | 7/2010 |
| EP | 2209062 A1 | 7/2010 |
| EP | 2 662 749 A1 | 11/2013 |
| JP | 2000-196718 A | 7/2000 |
| JP | 2006-236968 A | 9/2006 |
| JP | 2008-083262 A | 4/2008 |
| JP | 2008-083491 A | 4/2008 |
| JP | 2009-069333 A | 4/2009 |
| JP | 2010-139785 A | 6/2010 |
| JP | 2011-053262 A | 3/2011 |
| KR | 10 2009-0005908 A | 1/2009 |
| KR | 10 2010-0064936 A | 6/2010 |
| KR | 10 2011-0003583 A | 1/2011 |
| WO | WO 2009/057628 A1 | 5/2009 |

\* cited by examiner

DISPLAY DEVICE AND METHOD FOR FABRICATING THE SAME

CROSS-REFERENCE TO RELATED APPLICATION

A claim for priority under 35 U.S.C. §119 is made to Korean Patent Application No. 10-2012-0049089 filed May 9, 2012, in the Korean Intellectual Property Office, the entire contents of which are hereby incorporated by reference.

BACKGROUND

In recent years, various display devices are being developed that are applicable to multimedia devices such as televisions, handheld phones, automotive navigation systems, computer monitors, game machines, and the like.

SUMMARY

Embodiments may be realized by providing a display device including a display member that displays an image and a window member arranged on an upper surface of the display member. The window member includes a base member and a color layer, the color layer is arranged on a lower surface of the base member and partially overlapping the display member, a part of the window member overlaps the display member, and the part of the window member receives a portion of the image from the display member as a received image and transmitting the portion of the image therethrough as a transmitted image.

A brightness of the transmitted image may be lower than a brightness of the received image. The color layer may include a first portion that overlaps a border of the base member, and a second portion that connects one side of the first portion and another side of the first portion opposite to the one side. The second portion overlaps the display member.

The second portion may include a plurality of photo-blocking particles that reduces a brightness of the received image, and a plurality of photo-transmitting particles that transmits the received image as the transmitted image. The plurality of photo blocking particles may have a black color and the plurality of photo-transmitting particles may be transparent.

The first portion may include a dye or pigment that blocks an incident image directed toward the window member and an external light. The first portion may be formed of a same material of the second portion.

The display device may further include a reception member that is coupled with the window member and the reception member receives the display member therein. The display member may include a display panel that displays the image, and a touch panel that acquires coordinate information of an external input. The touch panel may be arranged between the display panel and the window member. The touch panel may be directly on the upper surface of the display panel. The display device may further include a photo curing adhesive layer that connects the window member and the touch panel.

Embodiments may also be realized by providing a display device that includes a display member that displays an image and a window member arranged on an upper surface of the display member. The window member includes a base member, a shield layer on a lower surface of the base member and overlapping a border of the base member, and a semi transmitting layer overlapping the display member. The semi-transmitting layer receives a portion of the image from the display member as a received image and transmitting the portion of the image as a transmitted image, and the semi-transmitting layer has opposing ends connected with one side of the shield layer and another side opposite to the one side, respectively.

A brightness of the transmitted image may be lower than a brightness of the received image. The semi-transmitting layer may include a plurality of photo-blocking particles that reduces the brightness of the received image, and a plurality of photo-transmitting particles that transmits the received image as the transmitted image. The shield layer may include a dye or pigment that blocks an external light incident toward the window member.

Embodiments may also be realized by providing a display device fabricating method that includes providing a window member that includes a base member, a color layer being provided on one surface of the base member, providing a display panel having a touch panel, connecting the base member and the display panel such that a photo-curing adhesive layer is disposed between the color layer and the touch panel, and hardening the photo-curing adhesive layer by radiating a light from an upper side of the base member. A part of the color layer overlaps the display panel and transmits a part of the light therethrough.

The color layer may include a first portion that overlaps a border of the base member, and a second portion that connects one side of the first portion and another side of the first portion opposite to the one side. The second portion may overlap the display member. The second portion may include a plurality of photo-blocking particles that blocks a portion of the light, and a plurality of photo-transmitting particles that transmits another portion of the light.

The first portion may be formed of a same material as the second portion. The method may further include connecting a reception member, which receives the display panel therein, and the window member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
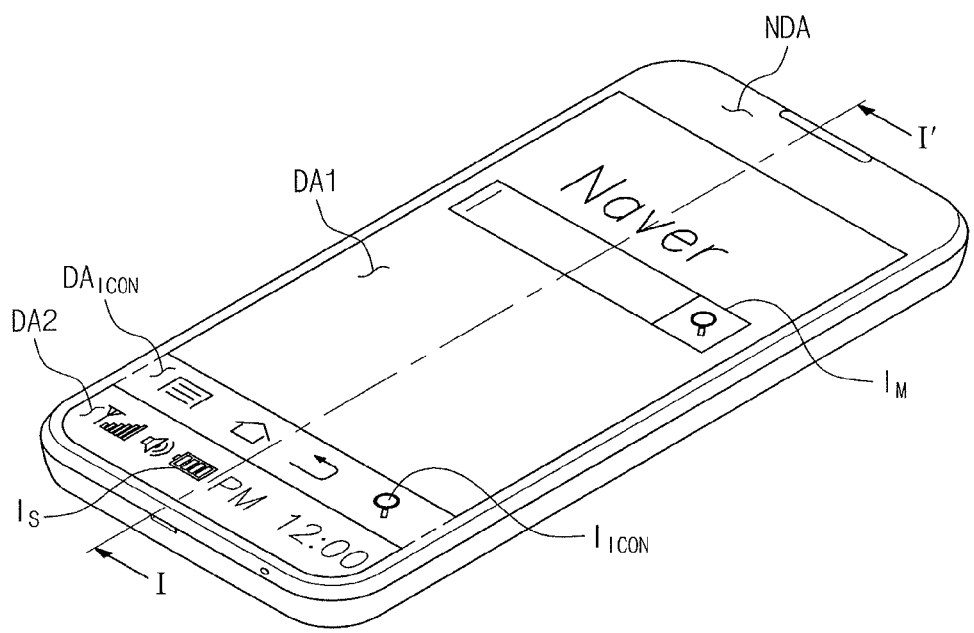
FIG. 1 illustrates a perspective view of a display device according to an exemplary embodiment.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey examples of implementations to those skilled in the art. Accordingly, known processes, elements, and techniques are not described with respect to some of the embodiments.

Unless otherwise noted, like reference numerals denote like elements throughout the attached drawings and written description, and thus descriptions will not be repeated. In the drawing figures, the dimensions of layers and regions may be exaggerated for clarity of illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments.

Spatially relative terms, such as "beneath," "below," "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 2:
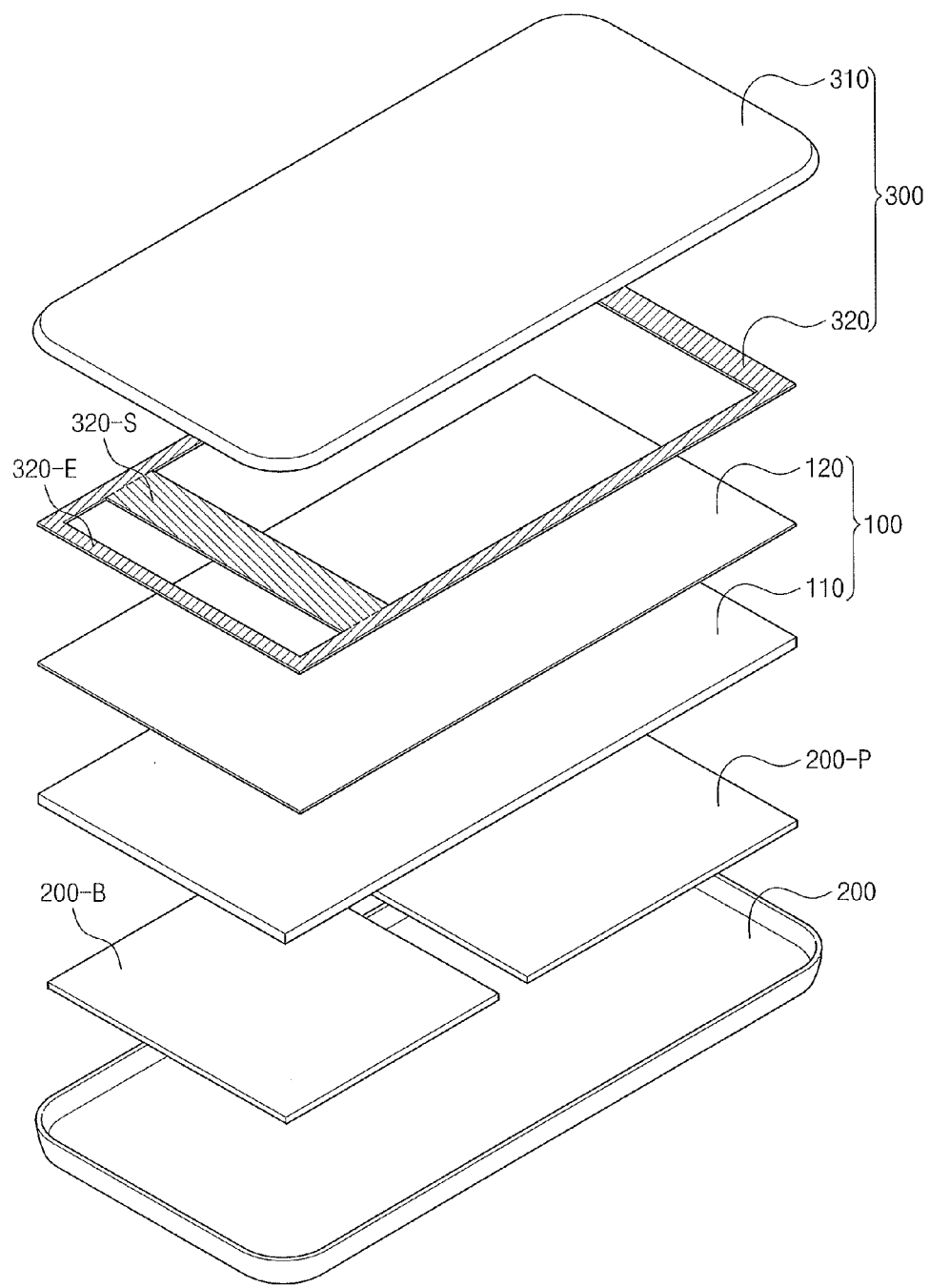
FIG. 2 illustrates an explored perspective view of the display device in FIG. 1.
Figure 3:
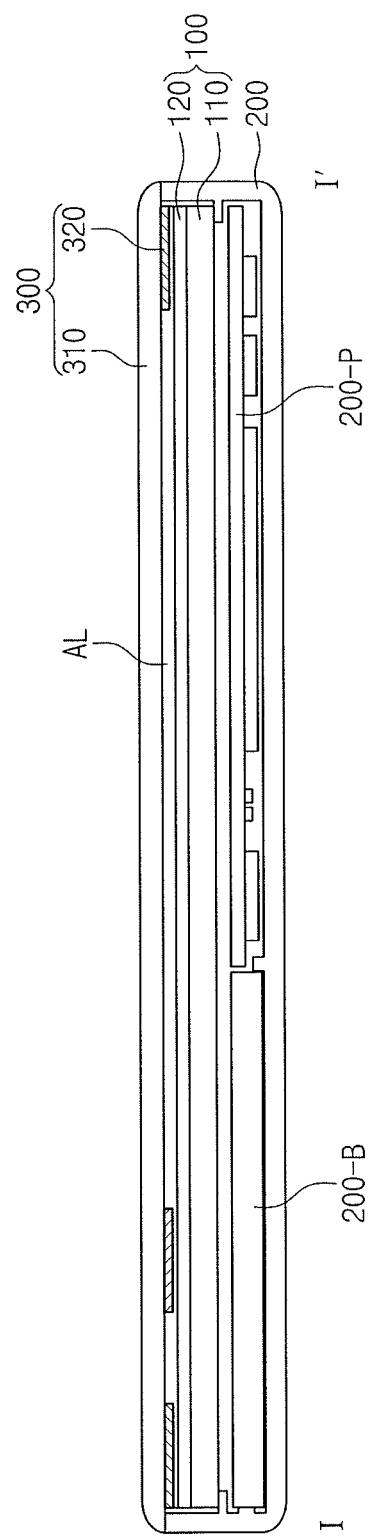
FIG. 3 illustrates a cross-sectional view taken along a line I-I' in FIG. 1.

FIG. 1 is a perspective view of a display device according to an exemplary embodiment. FIG. 2 is an explored perspective view of a display device in FIG. 1. FIG. 3 is a cross-sectional view taken along a line I-I' in FIG. 1. In FIGS. 1 to 3, a handheld phone is illustrated. However, embodiments are not limited thereto, e.g., the embodiments may be applied to various information providing devices such as televisions, handheld phones, automotive navigation systems, computer monitors, game machines, and the like.

As illustrated in FIG. 1, a display device may include a plurality of areas for displaying different images. The display device may include a first display area DA1, a second display area DA2, and an icon area $DA_{ICON}$ disposed between the first display area DA1 and the second display area DA2.

The first display area DA1 may display a main image $T_M$. For example, the main image $I_M$ may be a game, a picture, a moving picture, and/or a map. The second display area DA2 may display a supplementary image $I_S$. For example, the supplementary image $I_S$ may display a time, sensitivity information of a broadcasting signal, sensitivity information of a wireless communication signal, residual power information, and the like.

The first display area DA1 may be different in size from the second display area DA2. As illustrated in FIG. 1, the first display area DA1 may be larger, e.g., significantly larger, in size than the second display area DA2.

The icon area $DA_{ICON}$ may display an input icon image $I_{ICON}$ showing a specific function. For example, the input icon image $I_{ICON}$ may include a magnifying image indicating a search function, a home image indicating a menu function, a receiver image indicating a call function, and the like. The input icon image $I_{ICON}$ may further include a character image and the like.

The first display area DA1, the second display area DA2, and the icon area $DA_{ICON}$ may be surrounded by a non-display area NDA where no image is displayed. In other words, the non-display area NDA may form a border of the display device on a plane that includes the first display area DA1, the second display area DA2, and the icon area $DA_{ICON}$. The non-display area NDA may enclose, e.g., completely enclose, the first display area DA1, the second display area DA2, and the icon area $DA_{ICON}$ Embodiments are not limited to a display device having a plurality of display areas. For example, the display device may include a display area and an icon area, and the second display area DA2 may be omitted.

As illustrated in FIGS. 2 and 3, the display device may include a display member 100, a reception member 200 receiving the display member 100, and a window member 300 disposed on the display member 100.

The display member 100 may include a display panel 110 for generating an image and a touch panel 120 for calculating coordinate information of an external input. Herein, the external input may mean an input provided by a stylus pen, a finger of a user, and the like. The external input may be generated substantially on the window member 300.

The display panel 110 may not be limited to a specific type. For example, the display panel 110 may be an organic light emitting display panel, a liquid crystal display panel, a plasma display panel, an electrophoretic display panel, an electrowetting display panel, or the like.

The touch panel 120 may be, e.g., a resistive touch panel or a capacitive touch panel.

The resistive touch panel may be an analog resistive touch panel having two resistive films disposed to be spaced apart from each other, or a digital resistive touch panel having two first resistive patterns and two second resistive patterns disposed to be spaced apart from each other. The resistive touch panel may calculate coordinate information of a contact point by detecting a voltage when the two resistive films are contacted by an external pressure or when the first resistive patterns and the second resistive patterns are contacted by an external pressure.

The capacitive touch panel may have first sensing patterns and second sensing patterns, which second sensing patterns are isolated from the first sensing patterns, and disposed to be in an intersecting relationship with respect to each other. When an input mean is contacted with the capacitive touch panel, the capacitive touch panel may detect a variation of capacitance generated by the first sensing patterns and the second sensing patterns, and may calculate coordinate information of a contact point based on the detected variation of capacitance.

The touch panel 120 may be directly formed at the display panel 110. For example, one of the resistive films, the first resistive patterns, or the first sensing patterns may be disposed directly on one surface, e.g., an uppermost surface, of the display panel 110.

In other example embodiments, the touch panel 120 may be fabricated through a separate process, and may be coupled with the display panel 110. In this case, a substrate (not shown) of the display panel 110 and a substrate (not shown) of the touch panel 120 may be coupled by an adhesive layer (not shown). For example, a substrate forming the uppermost surface of the display panel 110 may be adhered to a substrate forming the lowermost surface of the tough panel 120.

In other example embodiments, the display member 100 may not include the touch panel 120.

The reception member 200 may receive the display member 100. For example, the display member 100 may be seated within, e.g., completely within, the reception member 200. A reception member formed of one member is illustrated in FIGS. 2 and 3. However, the reception member 200 may be formed of two or more members coupled to each another so as to form a housing that receives the display member 100.

In addition to the display member 100, the reception member 200 may further receive a circuit substrate 200-P therein. For example, the circuit substrate 200-P may be seated on a bottom surface of the reception member 200. The circuit substrate 200-P may include a plurality of active elements (not shown) and/or a plurality of passive elements (not shown) mounted thereon. Also, the reception member 200 may further receive a power supply unit 200-B (e.g., a battery) according to a type of display device. The power supply unit 200-B may be seated on the bottom surface of the reception member and may be adjacent to the circuit substrate 200-P. The circuit substrate 200-P and the power supply unit 200-B (if included) may be arranged between the display member 100 and the bottom surface of the reception member 200.

The window member 300 may be disposed on the display member 100, and may form an outer surface of a display device through coupling with the reception member 200. For example, the window member 300 may be seated on sidewalls of the reception member 200. For example, the display member 100 may be enclosed between the sidewall of the reception member 200 so as to be seated within the reception member 200, and the window member 300 may cover the reception member 200 to completely enclose the display member 100.

The window member 300 may include a base member 310 and a color layer 320. The base member 310 may be seated on the sidewalls of the reception member 200. The color layer 320 may be disposed on a lower surface of the base member 310, e.g., so as to be on the touch panel 120. A part of the color layer 320 may overlap the display member 100.

The base member 310 may be formed of a transparent member, e.g., a glass or a tempered glass larger in hardness than a general glass. In another exemplary embodiment, the base member 310 may be formed of a plastic or a transparent tempered plastic such as polycarbonate.

The part of the color layer 320 overlapped with the display member 100 may receive a part of an image from the display member 100 and have the image pass therethrough. For example, a part of the color layer 320 may receive an input icon image $I_{ICON}$ from the display member 100.

The color layer 320 may be divided into a first portion 320-E and a second portion 320-S. Ends of the second portion 320-S may be connected to, e.g., may be integrally formed with, the first portion 320-E.

A border of the base member 310 may overlap the first portion 320-E of the color layer 320. The first portion 320-E may have a closed line shape in which a penetration region is formed. The first portion 320-E may form a shield area (corresponding to a non-display area NDA of a display device in FIG. 1) itself. For example, the first portion 320-E may form an outer frame portion under outer edges of the base member 310 and overlapping the non-display area NDA. The second portion 320-S may connect one side of the first portion 320-E and the other side opposite to the one side thereof. The second portion 320-S may divide the penetration region formed by the first portion 320-E into two sub-penetration regions.

The color layer 320 may be excluded in a region enclosed by the first portion 320-E except only in a part of the region where the second portion 320-S is located. Accordingly, the second portion 320-S may overlap a portion of the display member 100 and may be in a non-overlapping relationship with the remaining portions of the display member 100. The part of the region where the second portion 320-S is located may define a relatively small part of the region enclosed by the first portion 320-E. For example, the color layer 320 may be excluded in areas where the first display area DA1 and the second display area DA2 are arranged thereunder. The second portion 320-S of the color layer 320 may be formed, e.g., only formed, in an area where the icon area $DA_{ICON}$ is arranged thereunder. Accordingly, a part of an input image may be passed by the second portion 320-S of the color layer 320, e.g., an input icon image $I_{ICON}$ from the display member 100 may pass through the second portion 320-S.

The second portion 320-S may form a semi-transmitting region itself In function, the first portion 320-E may be defined as a shield layer, and the second portion 320-S may be defined as a semi-transmitting region.

The first and second display areas DA1 and DA2 may substantially correspond to two sub-penetration regions divided by the second portion 320-S. The icon area $DA_{ICON}$ may correspond to a region where the second portion 320-S is formed.

As illustrated in FIG. 3, the display device may include a photo-curing adhesive layer AL. For example, the photo-curing adhesive layer AL may be disposed between one surface of the touch panel 120 and a lower surface of the base member 310. The photo-curing adhesive layer AL may be attached to the lower surface of the base member 310 with the color layer 320 interposed therebetween. The photo-curing adhesive layer AL may fill regions enclosed by the first portion 320-E in which the color layer 320 is excluded. The photo-curing adhesive layer AL may be attached to the one surface of the touch panel 120.

Referring to FIG. 3, the color layer 320 may be enclosed by the sidewalls of the reception member 200. Further, the base member 310 may be attached to upper surfaces of the sidewall of the reception member 200. Accordingly, the base member 310 and the reception member 200 may together form a structure that encases the display member 100, the color layer 320, and the photo-curing adhesive layer AL.

Figure 4:
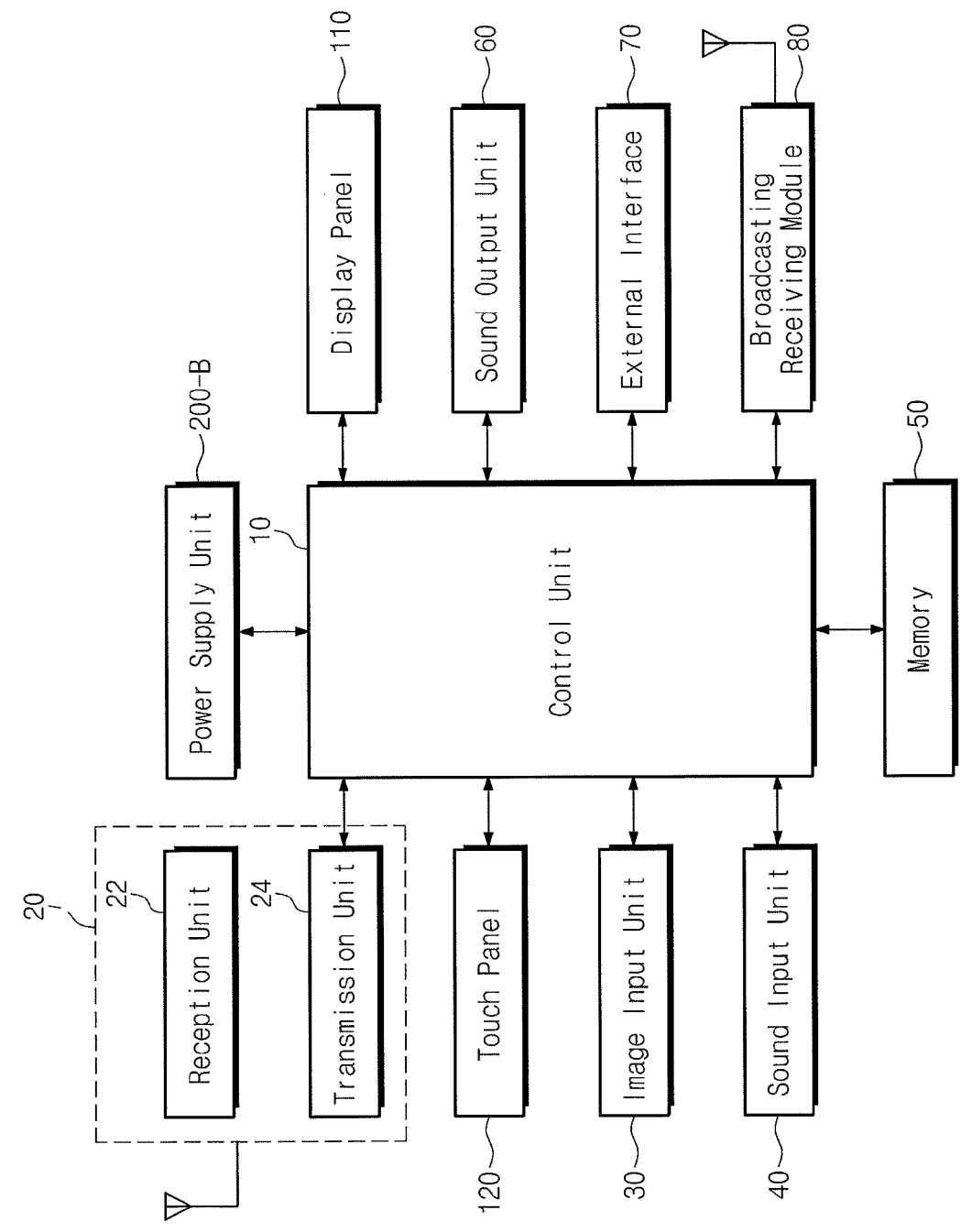
FIG. 4 illustrates a block diagram schematically illustrating a display device according to an exemplary embodiment.

FIG. 4 is a block diagram schematically illustrating a display device according to an exemplary embodiment. Below, an operation of a display device according to an exemplary embodiment will be described with reference to FIG. 4.

A display device according to an exemplary embodiment may include constituent elements for performing functions of the display device in addition to the display panel 110, the touch panel 120, and the power supply unit 200-B that are described above. The constituent elements to be described later may be formed of active or passive elements mounted at the above-described circuit substrate 200-P.

For example, the display device may further include at least one of a control unit 10, a wireless communication module 20, an image input unit 30, a sound input unit 40, a memory 50, a sound output unit 60, an external interface 70, and a broadcasting receiving module 80.

The control unit 10 may control an overall operation of receiving and sending data, e.g., an operation of a handheld phone. For example, the control unit 10 may perform controlling and processing associated with voice call, data communication, video call, and the like. That is, the control unit 10 may control the display panel 110, the image input unit 30, the memory 50, and the sound output unit 60 based on coordinate information provided from the touch panel 120.

The wireless communication module 20 may transmit and receive a wireless signal to and from a mobile communication base station through an antenna. For example, the wireless communication module 20 may transmit and receive voice data, character data, image data, and control data under the control of the control unit 10. For this, the wireless communication module 20 may include a transmission unit 24 configured to modulate and transmit a signal to be transmitted and a reception unit 22 configured to demodulate an input signal.

The image input unit 30 may convert an image signal into image data capable of being displayed at the display panel 110. The sound input unit 40 may convert a sound signal, received through a microphone at a call/record/voice recognition mode, into electrical voice data.

The sound input unit 40 may include various noise removing algorithms for removing a noise generated when an external sound signal is received.

The sound output unit 60 may convert sound data input from the wireless communication module 20 or sound data stored at the memory 50 to output it to the outside.

In addition to a portable terminal, the external interface 70 may be configured to interface with all external devices connected with the portable terminal, such as a wire/wireless headset, an external charger, a wire/wireless data port, a card socket (e.g., a memory card, a SIM/UIM card, etc.), and the like.

The broadcasting receiving module 80 may receive a broadcasting signal transferred through a satellite or a ground wave, and may convert the input broadcasting signal into a broadcasting data form capable of being output through the sound output unit 60 and the display panel 110.

Figure 5A:
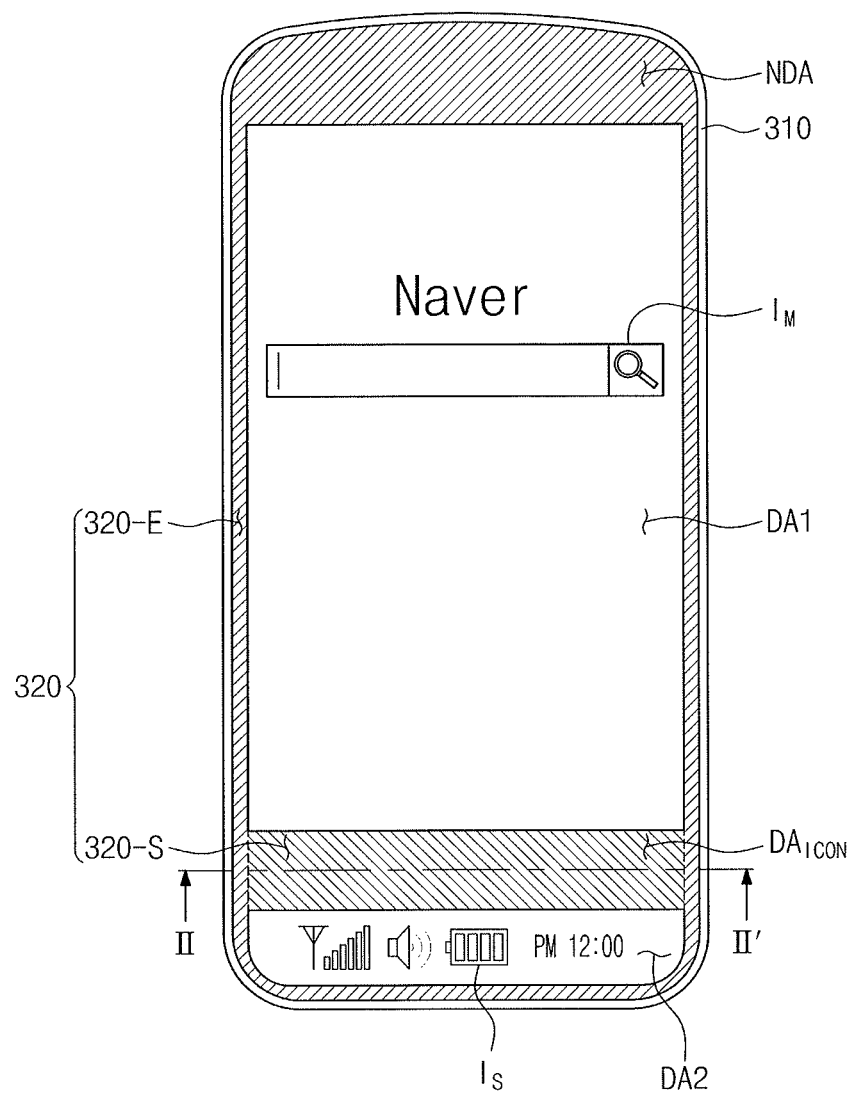
FIGS. 5A and 5B illustrate top views of a display device during different operational modes.
Figure 5B:
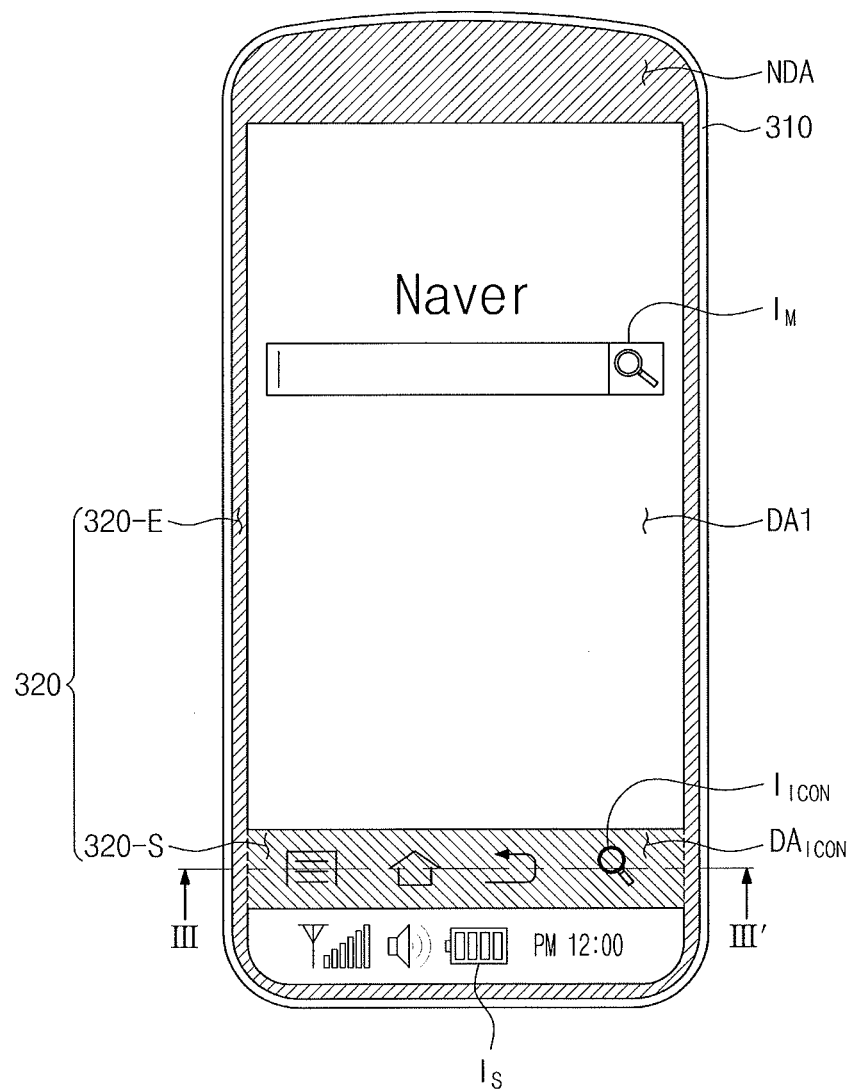

FIGS. 5A and 5B are top views of a display device during different operational modes.

As illustrated in FIG. 5A, an operating mode that no input icon image $I_{ICON}$ is displayed through a second portion 320-S may be defined as a first mode. As illustrated in FIG. 5B, an operating mode that the input icon image $I_{ICON}$ is displayed through the second portion 320-S may be defined as a second mode. The second portion 320-S may only overlap the icon area $DA_{ICON}$ so the operating modes of the first display area DA1 and the second display area DA2 may not be affected by the second portion 320-S.

If an operation of the display device commences, the display panel 110 (refer to FIG. 4) may display an image under the control of a control unit 10 (refer to FIG. 4). The image may include one or more of a main image $I_M$, a supplementary image IS, and the input icon image $I_{ICON}$.

At the first mode, the display panel 110 may not generate the input icon image $I_{ICON}$. At the first mode, the display panel 110 may generate the main image $I_M$ corresponding to a first display area DA1 of the display device and the supplementary image $I_S$ corresponding to a second area DA2 of the display device.

At the second mode, the display panel 110 may generate the main image $I_M$, the supplementary image $I_S$, and the input icon image $I_{ICON}$. The input icon image $I_{ICON}$ generated at a part of the display panel 110 (corresponding to an icon area DAICON) overlapped with the second portion 320-S of a color layer 320 may transmit the second portion 320-S to be displayed at the outside.

The main image IM and the supplementary image $I_S$ may not be displayed at the first mode and the second mode.

Figure 6A:
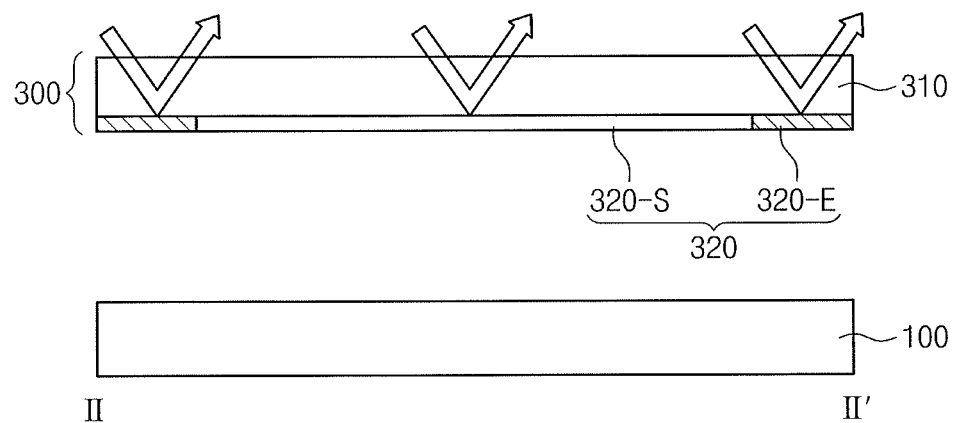
FIG. 6A illustrates a cross-sectional view taken along a line II-II' in FIG. 5A.
Figure 6B:
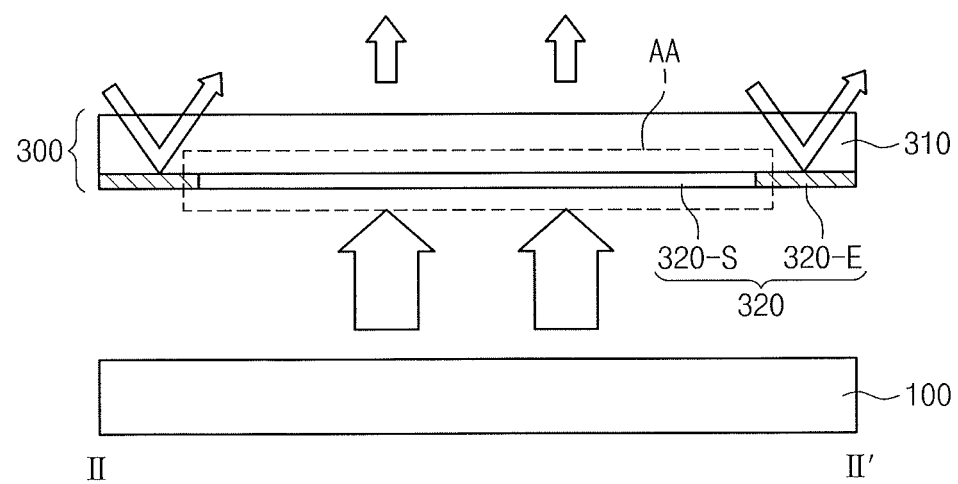
FIG. 6B illustrates a cross-sectional view taken along a line in FIG. 5B.
Figure 7:
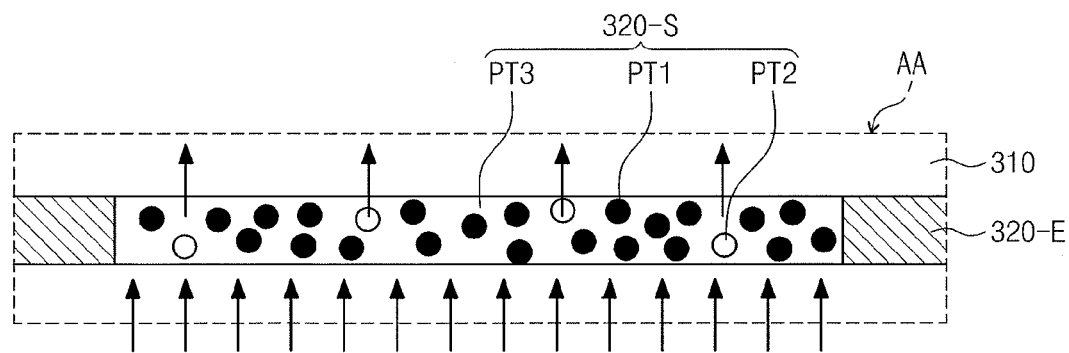
FIG. 7 illustrates an enlarged cross-sectional view of a region shown in a dotted line in FIG. 6B.

FIG. 6A is a cross-sectional view taken along a line II-II' in FIG. 5A. FIG. 6B is a cross-sectional view taken along a line in FIG. 5B. FIG. 7 is an enlarged cross-sectional view of a region shown in a dotted line in FIG. 6B. A display principle of an input icon image $I_{ICON}$ will be more fully described with reference to FIGS. 6A, 6B, and 7. For ease of description, in FIGS. 6A and 6B, there is illustrated the case that a window member 300 and a display member 100 are spaced apart. However, embodiments are not limited thereto, e.g., various configurations are possible without departing from the scope of the embodiments.

As illustrated in FIG. 6A, in the case that the display member 100 does not generate the input icon image $I_{ICON}$, the second portion 320-S of the color layer 320 may not display an image to the outside. For example, the second portion 320-S may act as a blocking layer such as a light blocking layer with respect to the icon area $DA_{ICON}$. Therefore, a part of an external light incident onto the color layer 320 may be absorbed, and a part thereof may be reflected. Although a less amount of the external light (e.g., a natural light) passes the second portion 320-S of the color layer 320, the first and second portions 320-E and 320-S of the color layer 320 may not be seemingly distinguished.

As illustrated in FIG. 6B, in the case that the display member 100 does generate the input icon image $I_{ICON}$, the input icon image $I_{ICON}$ may pass through the second portion 320-S of the color layer 320. Since the input icon image $I_{ICON}$ passes through the second portion 320-S of the color layer 320, its brightness may be reduced by way of passing through the color layer 320. The brightness of the input icon image $I_{ICON}$ passing through the second portion 320-S of the color layer 320 may be lower than that input to the second portion 320-S of the color layer 320. This will be more fully described with reference to FIG. 7.

As illustrated in FIG. 7, the second portion 320-S of the color layer 320 may include a plurality of photo-blocking particles PT1 blocking the input icon image $I_{ICON}$ and a plurality of photo-transmitting particles PT2 transmitting the input icon image $I_{ICON}$. Besides, the second portion 320-S of the color layer 320 may include an additive PT3 such as a surfactant, an adhesive, and the like. Accordingly to an exemplary embodiment, the photo-blocking particles PT1 and the photo-transmitting particles PT2, and the additive PT3 when included, may be formed of different materials that are dispersed throughout a base layer forming the second portion 320-S. For example, the photo-blocking particles PT1 and the photo-transmitting particles PT2 may be arranged throughout the entire base layer that defines the second portion 320-S of the color layer 320. The first portion 320-E of the color layer 320 may also include the photo-blocking particles PT1, the photo-transmitting particles PT2, and/or the additive PT3.

The plurality of photo-blocking particles PT1 may absorb the input icon image $I_{ICON}$. For example, the plurality of photo-blocking particles PT1 may have a black color. The plurality of photo-transmitting particles PT2 may transmit the input icon image $I_{ICON}$. For example, the plurality of photo-transmitting particles PT2 may be transparent.

Since a part of the input icon image $I_{ICON}$ incident onto the second portion 320-S of the color layer 320 passes through the second portion 320-S of the color layer 320, the brightness of the input icon image $I_{ICON}$ may be reduced.

The first portion 320-E of the color layer 320 may block an image incident toward the window member 300, and may include a dye or a pigment blocking an external light incident toward the window member 300. For example, the dye or pigment may have a black color. The first portion 320-E of the color layer 320 may further include an additive such as a surfactant, an adhesive, and the like.

According to an exemplary embodiment, the first portion 320-E may be formed of the same material as the second portion 320-S. However, the amount of external light passing through the first portion 320-E may be very less. Thus, elements covered by the first portion 320-E may not be recognized seemingly by a user.

In other example embodiments, the first portion 320-E of the color layer 320 may be formed of the same material as the second portion 320-S of the color layer 320. In such an exemplary embodiment, the first portion 320-E may be disposed to be adjacent to the display member 100 so as to be in a non-overlapping relationship with the display member 100, e.g., to not overlap an upper surface of the display member 100. In another exemplary embodiment, the first portion 320-E may overlap a non-display area on the display member 100, e.g., a dummy region or a region where pixels for producing images are excluded.

Figure 8A:
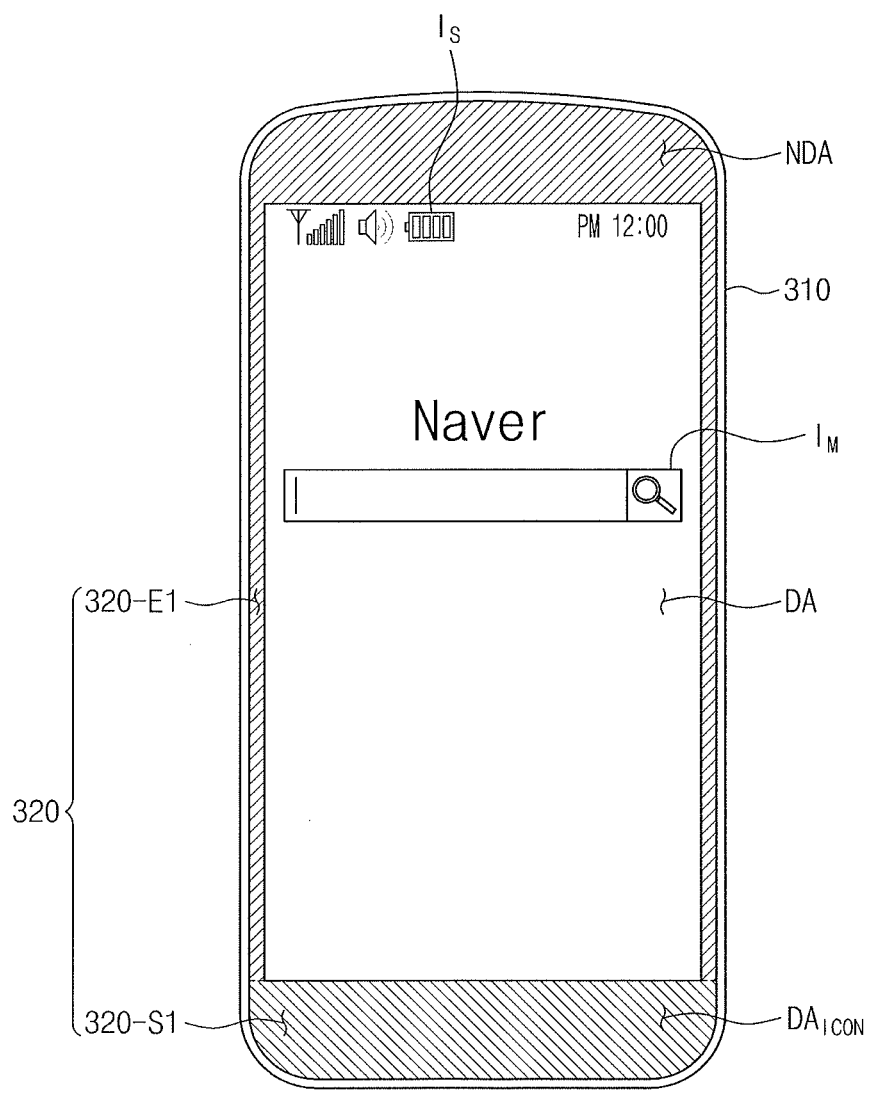
FIG. 8A illustrates a top view indicating a display device in a first mode according to an exemplary embodiment.
Figure 8B:
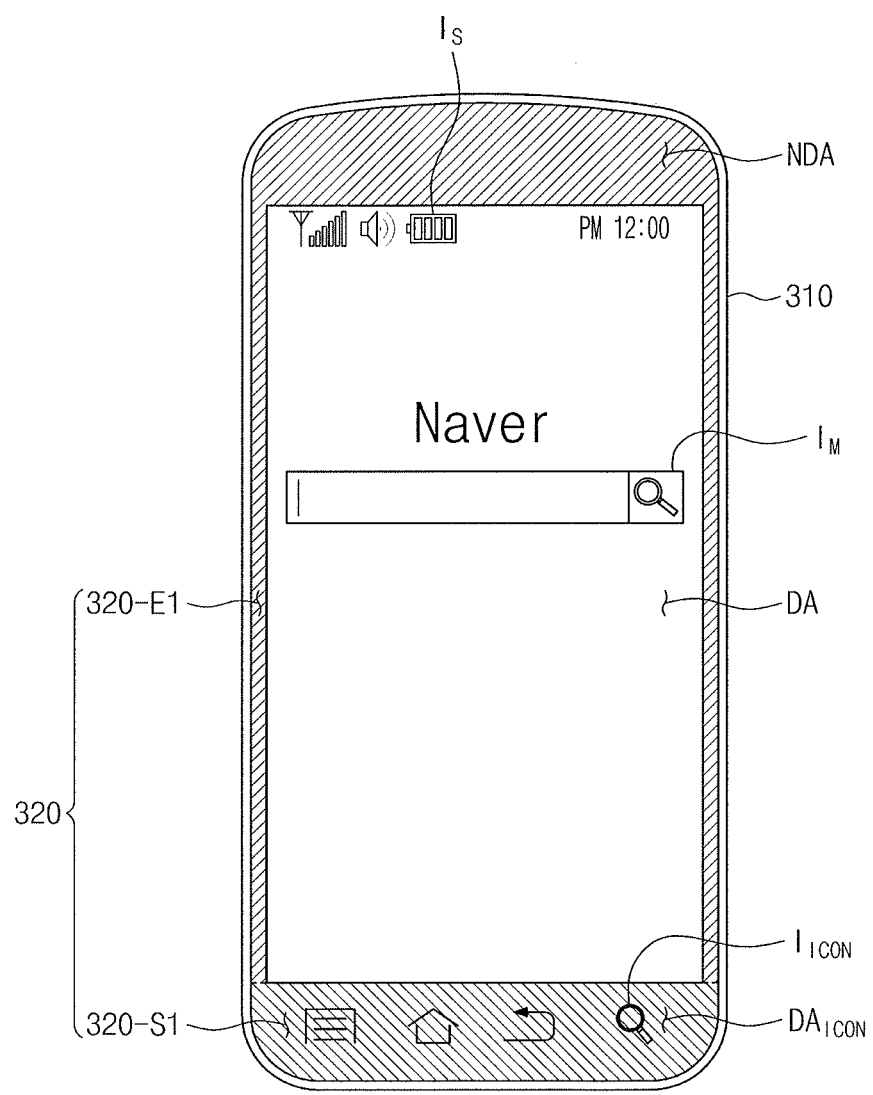
FIG. 8B illustrates a top view indicating a display device in a second mode according to another embodiment.

FIG. 8A is a top view indicating the case a display device that is operating in a first mode, according to another exemplary embodiment. FIG. 8B is a top view indicating the case a display device that is operating in a second mode, according to another exemplary embodiment.

A display device may be substantially the same as that described with reference to FIGS. 1 to 7 except for a shape of a color layer 320. Thus, constituent elements that are equal to those described with reference to FIGS. 1 to 7 may be marked by the same reference numerals, and description thereof is thus omitted.

As illustrated in FIGS. 8A and 8B, a window member 300 may include a base member 310 and a color layer 320 disposed at one surface of the base member 310. The color layer 320 may be divided into a first portion 320-E1 and a second portion 320-S1.

The first portion 320-E1 may be disposed at a part of a border of the base member 310. The second portion 320-S1 may be connected to the first portion 320-E1, and may be disposed at the reset of the border of the base member 310. The second portion 320-S1 may overlap the display member 100.

According to a shape of the color layer 320, the display device may include at least one display area DA, one icon area $DA_{ICON}$, and a non-display area NDA. The non-display area NDA may surround the display area DA and the icon area $DA_{ICON}$. The display area DA may display a main image $I_M$ and a supplementary image $I_S$, and the icon area $DA_{ICON}$ may display an input icon image $I_{ICON}$.

The first portion 320-E1 of the color layer 320 may form an outer frame portion under outer edges of the base member 310. The second portion 320-S1 may be extend along at least one side of the outer frame portion of the first portion 320-E1. For example, the second portion 320-S1 may extend along a short side of the first portion 320E1. The second portion 320-S1 may only overlap the icon area $DA_{ICON}$ of the display member 100. Alternatively, the second portion 320-S1 may overlap both the icon area $DA_{ICON}$ and the non-display area NDA.

FIGS. 9A to 9E illustrate cross-sectional views depicting stages in a method of fabricating a display device according to an exemplary embodiment. Below, a fabricating method of a display device according to an embodiment of the inventive concept will be more fully described with reference to FIGS. 9A to 9E.

Figure 9A:
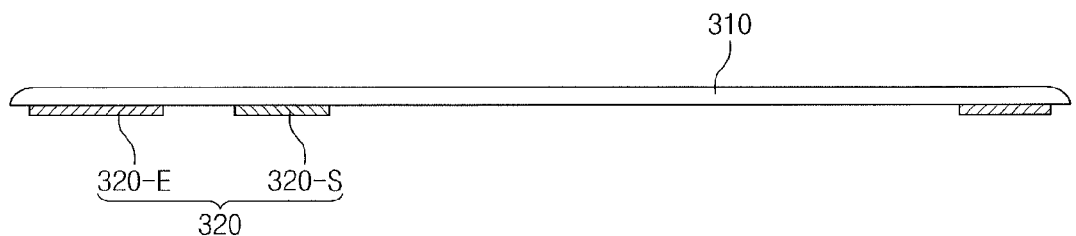
FIGS. 9A to 9E illustrate cross-sectional views depicting stages in a method of fabricating a display device according to an exemplary embodiment.

As illustrated in FIG. 9A, there may be provided a window member 300 where a color layer 320 is formed on one surface of a base member 310. For example, a plane shape of the color layer 320 may be the same as illustrated in FIGS. 5A and 5B, or 8A and 8B.

The window member 300 may be fabricated by printing the color layer 320 on one surface of the base member 310. In the event that a first portion 320-E and a second portion 320-S are formed of the same material, the first portion 320-E and the second portion 320-S may be printed at the same time. In the event that the first portion 320-E and the second portion 320-S are formed of different materials, one of the first portion 320-E and the second portion 320-S may be printed first.

The second portion 320-S may include a plurality of photo-blocking particles blocking a light and a plurality of photo-transmitting particles transmitting the light. Besides, the second portion 320-S may further include an additive such as a surfactant, an adhesive, and the like.

Figure 9B:

As illustrated in FIG. 9B, there may be provided a display panel including a touch panel 120. The touch panel 120 may be directly formed on one surface of the display panel 110, or a finished touch panel 120 may be coupled with one surface of the display panel 110.

An order of steps described with reference to FIGS. 9A and 9B may not be limited to this disclosure. For example, the touch panel 120 may be disposed on the display panel 110 at the same time when the window member 300 is fabricated.

Figure 9C:
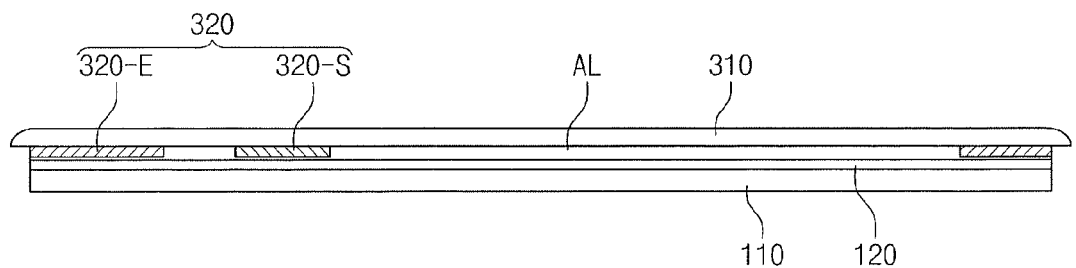

As illustrated in FIG. 9C, the base member 310 and the display panel 110 may be coupled such that a photo-curing adhesive layer AL is disposed between the color layer 320 and the touch panel 120. The second portion 320-S of the color layer 320 may be at least overlapped with the display panel 110.

After the photo-curing adhesive layer AL is formed by coating a photo-curing adhesive material on one surface of the base member 310 having the color layer 320, the display panel 110 may be coupled with the base member 310 such that the touch panel 120 is contacted with the photo-curing adhesive layer AL. Also, after the photo-curing adhesive layer AL is formed by coating a photo-curing adhesive material on one surface of the base member 310 having the color layer 320, the base member 310 may be coupled with the display panel 110 such that the color layer 320 is contacted with the photo-curing adhesive layer AL.

Figure 9D:
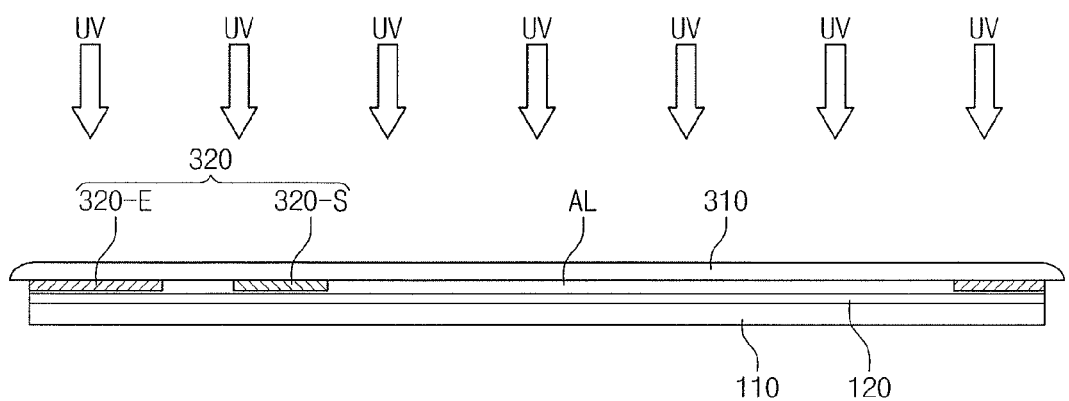

As illustrated in FIG. 9D, the photo-curing adhesive layer AL may be hardened by a light radiated from the upper side of the base member 310. The light radiated from the upper side of the base member 310 may be ultraviolet (UV). A part of a light incident onto the second portion 320-S of the color layer 320 may pass through the second portion 320-S.

In detail, a part of a light incident onto the second portion 320-S (during the photo-curing of the photo-curing adhesive layer AL) of the color layer 320 may pass through the photo-transmitting particles of the second portion 320-S. Thus, it is possible to reduce the possibility of and/or prevent a part of the photo-curing adhesive layer AL, which is in an overlapping-relationship with the second portion 320-S, from not being cured (from not being hardened).

The first portion 320-E can be formed of the same material as the second portion 320-S. A part of the photo-curing adhesive layer AL not overlapped with the first portion 320-E as well as a part of the photo-curing adhesive layer AL overlapped with the first portion 320-E may be cured uniformly.

Figure 9E:
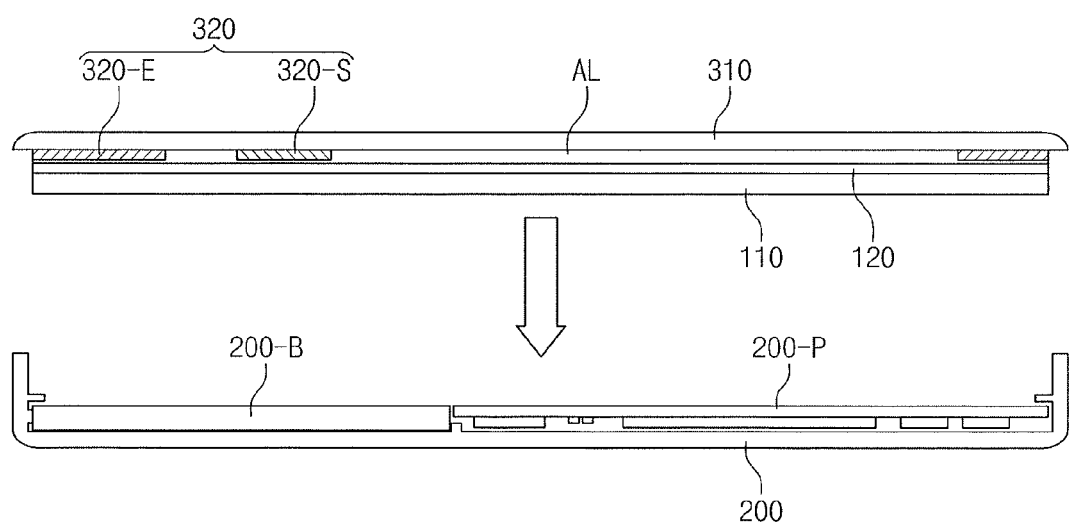

Afterwards, as illustrated in FIG. 9E, the window member 300 and the reception member 200 may be coupled such that the display member 100 is received therebetween. The reception member 200 may further receive the circuit substrate 200-P and the power supply unit 200-B such as a battery.

By way of summation and review, a display device may have a plurality of input buttons to execute various functions such as volume control, menu selection, and the like. The input buttons may be installed with respect to the display device, independently. The display device may perform functions corresponding to selected input buttons, e.g., the display device may perform one function corresponding to one selected input button.

A touch panel may be installed with respect to the display device to simplify input buttons. A display device including the touch panel may have input icons corresponding to the input buttons, respectively. For example, the input icons may be printed such that a window member of a display device including a touch panel is capable of being touched.

If a user selects one of the input icons, the touch panel may acquire coordinate information of the selected input icon. A display device including the touch panel may perform a function corresponding to the selected icon based on the coordinate information. That is, the display device may display an image corresponding to the selected icon. With a conventional display device, input icons may be recognized by a user regardless of whether it is operated or not. For example, the user may recognize the input icons even when the display device is turned off With the above description, embodiments described herein relate to a display device and a method of fabricating the same in which the display member displays an image and a window member is disposed at an upper side of the display member. For example, a display device according to embodiments may have an area that displays an input icon. The input icon may be displayed at a specific operating mode of the display device. The area displaying the input icon may be defined by a color layer disposed on a base member. The area displaying the input icon may correspond to a part of the color layer. The input icon generated when the display device operates at the specific operating mode may be provided to a user through a part of the color layer overlapped with the display panel.

With the display device fabricating method, after the window member and the display panel are coupled, a photo-curing adhesive layer may be hardened by radiating a light from the upper side of the window member. A part of a light incident onto the color layer may pass through the color layer. That is, a part of the photo-curing adhesive layer overlapped with the color layer may receive a part of the light. Thus, it is possible to cure the photo-curing adhesive layer uniformly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a display member that displays an image; and
a window member arranged on an upper surface of the display member,
the window member including a base member and a color layer, the color layer being arranged on a lower surface of the base member and partially overlapping the display member,
the color layer including a first portion overlapping a border of the base member, and a second portion connecting one side of the first portion and another side of the first portion opposite to the one side,
the second portion of the color layer overlapping the display member, receiving a portion of the image from the display member as a received image, and transmitting the portion of the image therethrough as a transmitted image, and
the second portion of the color layer including a plurality of photo-blocking particles that reduces a brightness of the received image, and a plurality of photo-transmitting particles that transmits the received image as the transmitted image.

2. The display device as claimed in claim 1, wherein a brightness of the transmitted image is lower than a brightness of the received image.

3. The display device as claimed in claim 1, wherein the plurality of photo-blocking particles has a black color and the plurality of photo-transmitting particles is transparent.

4. The display device as claimed in claim 1, wherein the first portion includes a dye or pigment that blocks an incident image directed toward the window member and an external light.

5. The display device as claimed in claim 1, wherein the first portion is formed of a same material of the second portion.

6. The display device as claimed in claim 1, further comprising a reception member that is coupled with the window member, the reception member receiving the display member therein.

7. The display device as claimed in claim 6, wherein the display member includes:
a display panel that displays the image, and
a touch panel that acquires coordinate information of an external input, the touch panel being arranged between the display panel and the window member.

8. The display device as claimed in claim 7, wherein the touch panel is directly on the upper surface of the display panel.

9. The display device as claimed in claim 7, further comprising a photo-curing adhesive layer that connects the window member and the touch panel.

10. A display device, comprising:
a display member that displays an image; and
a window member arranged on an upper surface of the display member,
the window member including a base member, and a semi-transmitting layer overlapping the display member,
the semi-transmitting layer receiving a portion of the image from the display member as a received image and transmitting the portion of the image as a transmitted image, the semi-transmitting layer including a first region overlapping a border of the base member, and a second region connecting one side of the first region and another side of the first region opposite to the one side, and
the first region of the semi-transmitting layer including a plurality of photo-blocking particles that reduces a brightness of the received image, and a plurality of photo-transmitting particles that transmits the received image as the transmitted image.

11. The display device as claimed in claim 10, wherein a brightness of the transmitted image is lower than a brightness of the received image.

12. The display device as claimed in claim 11, wherein the semi-transmitting layer includes:
a plurality of photo-blocking particles that reduces the brightness of the received image, and
a plurality of photo-transmitting particles that transmits the received image as the transmitted image.

13. The display device as claimed in claim 12, wherein the second region of the semi-transmitting layer includes a dye or pigment that blocks an external light incident toward the window member.

14. A display device fabricating method, the method comprising:
providing a window member that includes a base member, a color layer being provided on one surface of the base member;
providing a display panel having a touch panel;
connecting the base member and the display panel such that a photo-curing adhesive layer is disposed between the color layer and the touch panel; and
hardening the photo-curing adhesive layer by radiating a light from an upper side of the base member, the color layer including a first portion overlapping a border of the base member, and a second portion connecting one side of the first portion and another side of the first portion opposite to the one side, the color layer overlapping the display panel and transmitting a part of the light therethrough,
wherein the second portion of the color layer includes a plurality of photo-blocking particles that blocks a portion of the light and a plurality of photo-transmitting particles that transmits another portion of the light.

15. The display device fabricating method as claimed in claim 14, wherein the first portion is formed of a same material as the second portion.

16. The display device fabricating method as claimed in claim 14, further comprising connecting a reception member, which receives the display panel therein, and the window member.

* * * * *